United States Patent
Niewiadomski et al.

(10) Patent No.: US 11,299,158 B2
(45) Date of Patent: Apr. 12, 2022

(54) UNINTENDED STANDSTILL RESPONSE IN AN ASSISTED HITCHING OPERATION

(71) Applicant: Ford Global Technologies, LLC, Dearborn, MI (US)

(72) Inventors: Luke Niewiadomski, Dearborn, MI (US); Li Xu, Northville, MI (US); Roger Trombley, Ann Arbor, MI (US); Donald Jacob Mattern, Canton, MI (US); Yu Ling, Canton, MI (US); Arnav Sharma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 16/459,960

(22) Filed: Jul. 2, 2019

(65) Prior Publication Data

US 2021/0001854 A1    Jan. 7, 2021

(51) Int. Cl.
*B60W 30/18* (2012.01)
*B60W 10/18* (2012.01)
(Continued)

(52) U.S. Cl.
CPC ...... *B60W 30/18036* (2013.01); *B60W 10/04* (2013.01); *B60W 10/18* (2013.01);
(Continued)

(58) Field of Classification Search
CPC ........... B60W 30/18036; B60W 10/18; B60W 10/04; B60W 10/20; B60W 50/14; B60W 2552/15; B60W 2552/20; B60W 2050/146; B60W 2710/18; B60W 2540/12; B60W 2520/10; B60W 2520/28; B60W 2300/14; B60W 2420/42; B60W 2554/20;
(Continued)

(56) References Cited

U.S. PATENT DOCUMENTS 6,138,063 A    10/2000 Himeda
7,263,419 B2   8/2007 Wheals et al.
(Continued)

FOREIGN PATENT DOCUMENTS

CA    2739989         12/2016
DE    10144797 A1     3/2003
JP    4434179 B2      3/2010

*Primary Examiner* — Alan D Hutchinson
(74) *Attorney, Agent, or Firm* — Raymond Coppiellie; Price Heneveld LLP

(57) ABSTRACT

A system for assisting in aligning a vehicle for hitching with a trailer includes an imaging system, a vehicle control system including at least one vehicle sensor, and a controller. The controller controls the vehicle using the vehicle control system to move the vehicle into an aligned position, where a hitch ball on the vehicle is aligned with the coupler, including monitoring a signal from the vehicle sensor and tracking a position of the coupler relative to the hitch ball in image data. When the signal indicates an unintended stopped vehicle state, the controller determines a distance from the hitch ball to the coupler. If the distance is above a predetermined threshold, the controller controls the vehicle control system to cause the vehicle to move. If the distance is below the predetermined threshold, the controller indicates the unintended stopped vehicle state to a driver of the vehicle.

20 Claims, 13 Drawing Sheets

(51) Int. Cl.
  *B60W 10/04*   (2006.01)
  *B60W 10/20*   (2006.01)
  *B60W 50/14*   (2020.01)
  *B60D 1/36*   (2006.01)
  *B60D 1/06*   (2006.01)

(52) U.S. Cl.
  CPC ............ *B60W 10/20* (2013.01); *B60W 50/14* (2013.01); *B60D 1/06* (2013.01); *B60D 1/36* (2013.01); *B60W 2050/146* (2013.01); *B60W 2300/14* (2013.01); *B60W 2420/42* (2013.01); *B60W 2520/10* (2013.01); *B60W 2520/28* (2013.01); *B60W 2540/12* (2013.01); *B60W 2552/15* (2020.02); *B60W 2552/20* (2020.02); *B60W 2710/18* (2013.01)

(58) Field of Classification Search
  CPC .. B60W 2554/80; B60W 10/06; B60W 10/10; B60W 40/105; B60W 40/10; B60W 40/112; B60W 50/08; B60W 2050/0043; B60W 2520/00; B60W 2710/06; B60W 2710/1005; B60W 2710/20; B60D 1/36; B60D 1/06; B60D 1/62
  See application file for complete search history.

(56) References Cited

U.S. PATENT DOCUMENTS

| | | |
|---|---|---|
| 9,716,565 B2 | 7/2017 | Mandeville-Clarke et al. |
| 2010/0044998 A1* | 2/2010 | Franchineau .......... B60D 1/481 |
| | | 280/491.1 |
| 2017/0364070 A1 | 12/2017 | Oba |
| 2020/0039517 A1* | 2/2020 | Berkemeier ............. B60D 1/06 |

\* cited by examiner

UNINTENDED STANDSTILL RESPONSE IN AN ASSISTED HITCHING OPERATION

FIELD OF THE INVENTION

The present invention generally relates to a vehicle hitch assistance system. In particular, the system provides the user with various options for assisting in hitching a vehicle with a trailer and targets for initial alignment of the vehicle prior to assistance in hitching.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE INVENTION

According to one aspect of the present disclosure, a system for assisting in aligning a vehicle for hitching with a trailer includes an imaging system outputting image data, vehicle control system including at least one vehicle sensor outputting a signal including information related to a vehicle movement state, and a controller. The controller controls the vehicle using the vehicle control system to move the vehicle into an aligned position, where a hitch ball mounted on the vehicle is aligned with the coupler, including monitoring the signal from the vehicle sensor and tracking a position of the coupler relative to the hitch ball in the image data. When the information related to the vehicle movement state indicates an unintended stopped vehicle state, the controller determines a distance from the hitch ball to the coupler. If the distance is above a predetermined threshold, the controller controls the vehicle control system to cause the vehicle to move. If the distance is below the predetermined threshold, the controller indicates the unintended stopped vehicle state to a driver of the vehicle.

Embodiments of the first aspect of the invention can include any one or a combination of the following features:
- the predetermined threshold is set at a distance from the hitch ball to the coupler sufficient for the controller to control the vehicle brake system and the vehicle powertrain control system to cause the vehicle to overcome the stopped vehicle condition;
- the predetermined threshold is between 15 and 20 centimeters;
- if the distance is below the predetermined threshold, the controller stops controlling the vehicle using the vehicle control system without the vehicle moving into the aligned position;
- the vehicle control system further includes a vehicle brake system having a parking brake, and prior to the controller stopping controlling the vehicle, the controller uses the vehicle control system to actuate the parking brake;
- when indicating the unintended stopped vehicle condition, the controller requests that the driver of the vehicle use the vehicle control system to move the vehicle in a forward direction.
- when the distance from the hitch ball to the coupler increases to above the predetermined threshold, the controller notifies the driver and resumes controlling the vehicle using the vehicle control system to move the vehicle into the aligned position;
- when the information related to the vehicle movement state indicates the unintended stopped vehicle state, the controller further uses information from the at least one vehicle sensor to determine a cause of the unintended stopped vehicle state and includes a communication of the cause when indicating the unintended stopped vehicle state to the driver of the vehicle.
- the at least one vehicle sensor is at least one of a brake pedal sensor, a system fault monitor, a vehicle speed sensor, a vehicle incline sensor, and a wheel rotation sensor, and the controller uses information from the at least one vehicle sensor to determine the cause of the unintended stopped vehicle condition among one of: a driver-applied braking event, a system fault, a high road-grade condition, an object contact condition, a stuck-vehicle condition, or a uneven terrain condition;
- the vehicle control system includes a vehicle brake system, a vehicle powertrain control system, and a vehicle steering system, and controlling the vehicle using the vehicle control system includes using the vehicle brake system, the vehicle powertrain control system, and the vehicle steering system; and
- an unintended stopped vehicle state is indicated when the vehicle is stopped without the controller having controlled the vehicle brake system to stop the vehicle.

According to another aspect of the present disclosure, a vehicle includes an imaging system outputting image data, a control system including at least one vehicle sensor outputting a signal including information related to a vehicle movement state, and a hitch assistance system. The alignment system controls the vehicle using the vehicle control system to move the vehicle into an aligned position, where a hitch ball mounted on the vehicle is aligned with a coupler of the trailer, including monitoring the signal from the vehicle sensor and tracking a position of the coupler relative to the hitch ball in the image data. When the information related to the vehicle movement state indicates an unintended stopped vehicle state, the alignment system determines a distance from the hitch ball to the coupler. If the distance is above a predetermined threshold, the alignment system controls the vehicle brake system and the vehicle powertrain control system to cause the vehicle to move. If the distance is below a predetermined threshold, the alignment system indicates the unintended stopped vehicle state to a driver of the vehicle.

According to another aspect of the present disclosure, a method for moving a vehicle to align a hitch ball mounted on the vehicle with a coupler of a trailer includes controlling a vehicle control system to move the vehicle toward the trailer, tracking a position of the coupler relative to the hitch ball in image data received from a vehicle imaging system, and monitoring a signal from a vehicle sensor including information related to a vehicle movement state. When the information related to the vehicle movement state indicates an unintended stopped vehicle state, a distance from the hitch ball to the coupler is determined. If the distance is above a predetermined threshold, the vehicle brake system and the vehicle powertrain control system are controlled to cause the vehicle to move. If the distance is below a predetermined threshold, the unintended stopped vehicle state is indicated to a driver of the vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
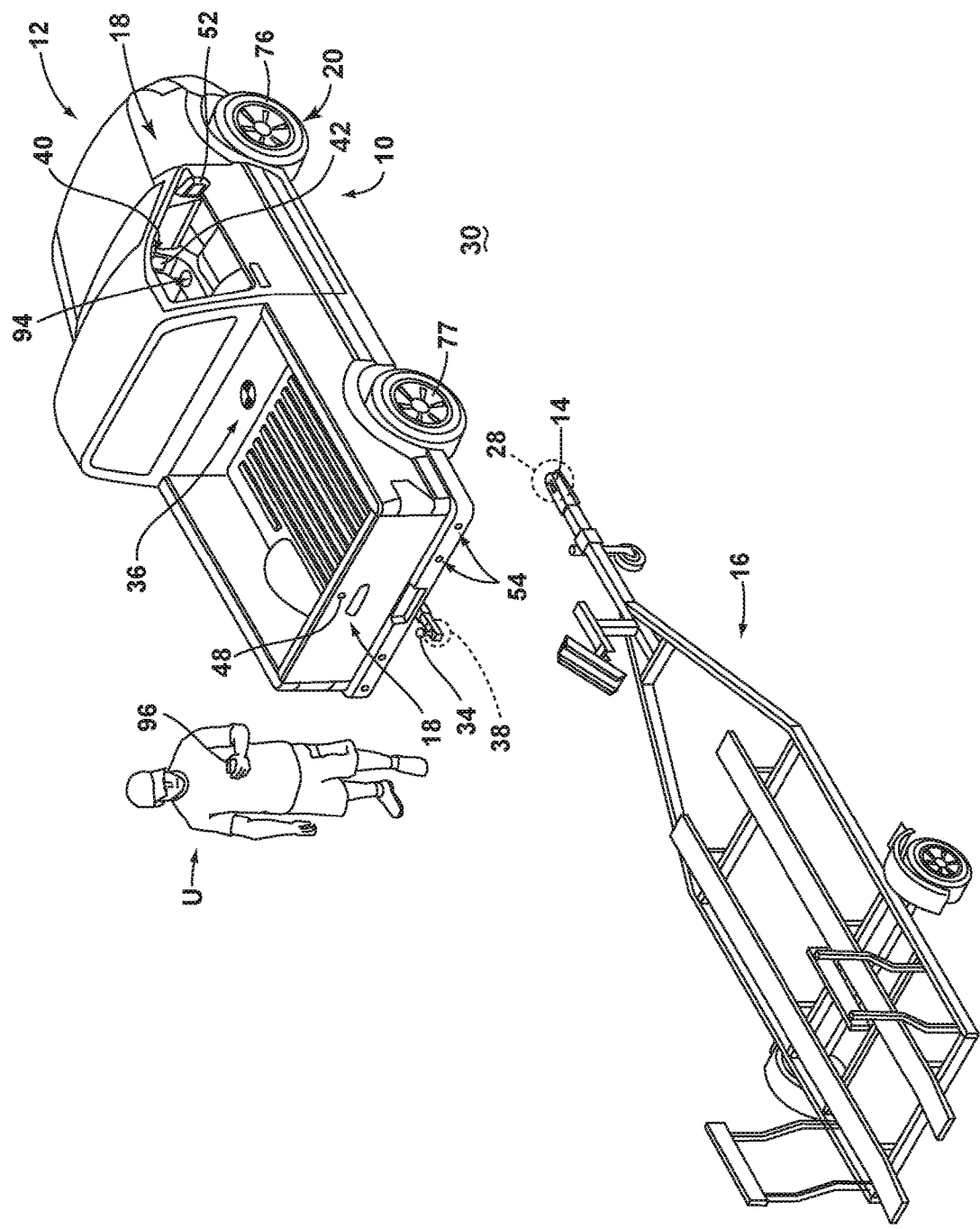
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular system 10 includes an imaging system 18 outputting image data 55. System 10 includes vehicle control system including at least one vehicle sensor 56 outputting a signal including information related to a vehicle movement state, and a controller 26. The controller 26 controls the vehicle 12 using the vehicle control system to move the vehicle 12 into an aligned position, where a hitch ball 34 mounted on the vehicle 12 is aligned with the coupler 14, including monitoring the signal from the vehicle sensor 56 and tracking a position 28 of the coupler 14 relative to the hitch ball 34 in the image data 55. When the information related to the vehicle movement state indicates an unintended stopped vehicle state, the controller 26 determines a distance $D_c$ from the hitch ball 34 to the coupler 14. If the distance $D_c$ is above a predetermined threshold $D_{min}$, the controller 26 controls the vehicle control system to cause the vehicle 12 to move. If the distance $D_c$ is below the predetermined threshold $D_{min}$, the controller 26 indicates the unintended stopped vehicle state to a driver of the vehicle 12.

Figure 2:
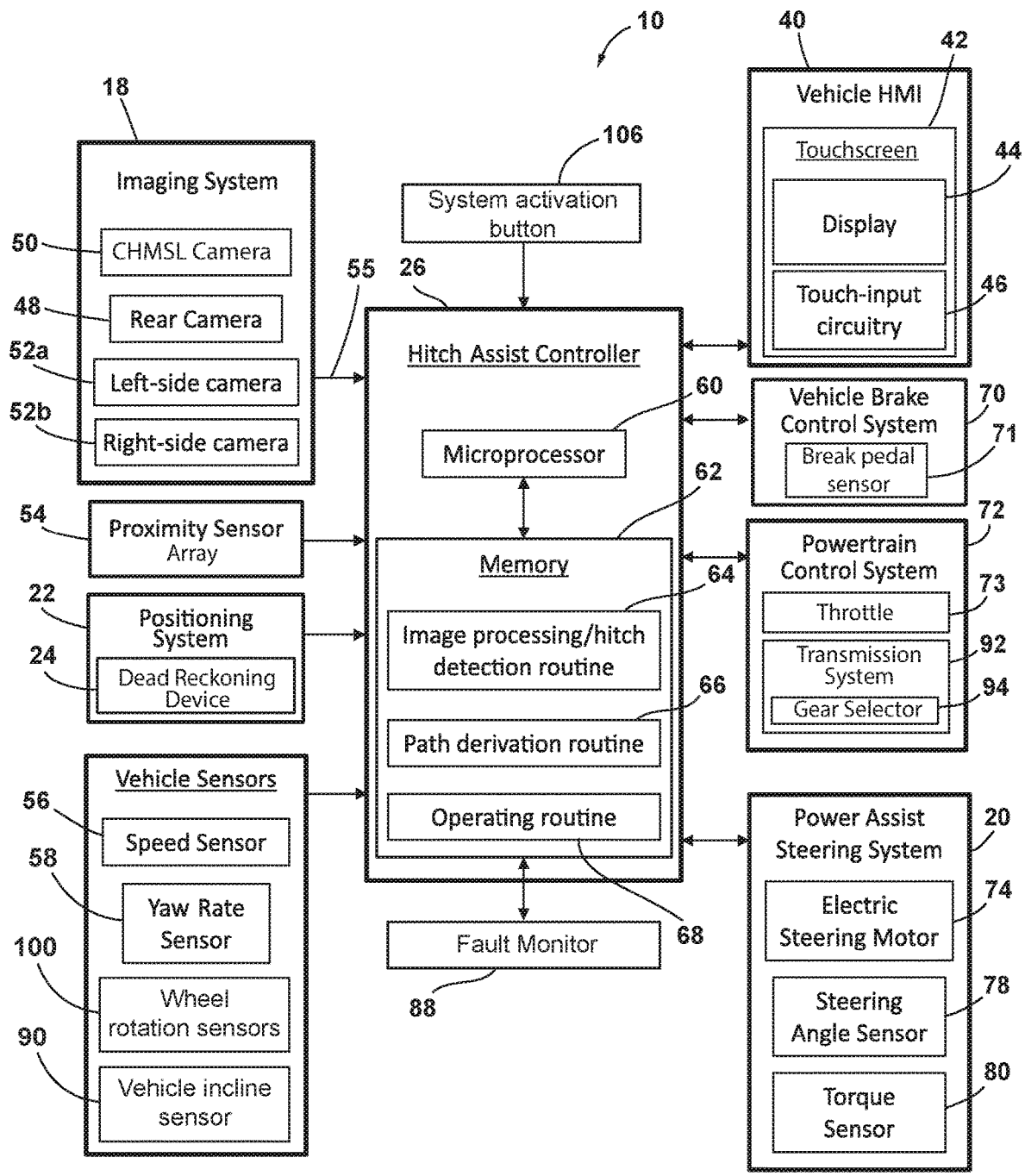
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
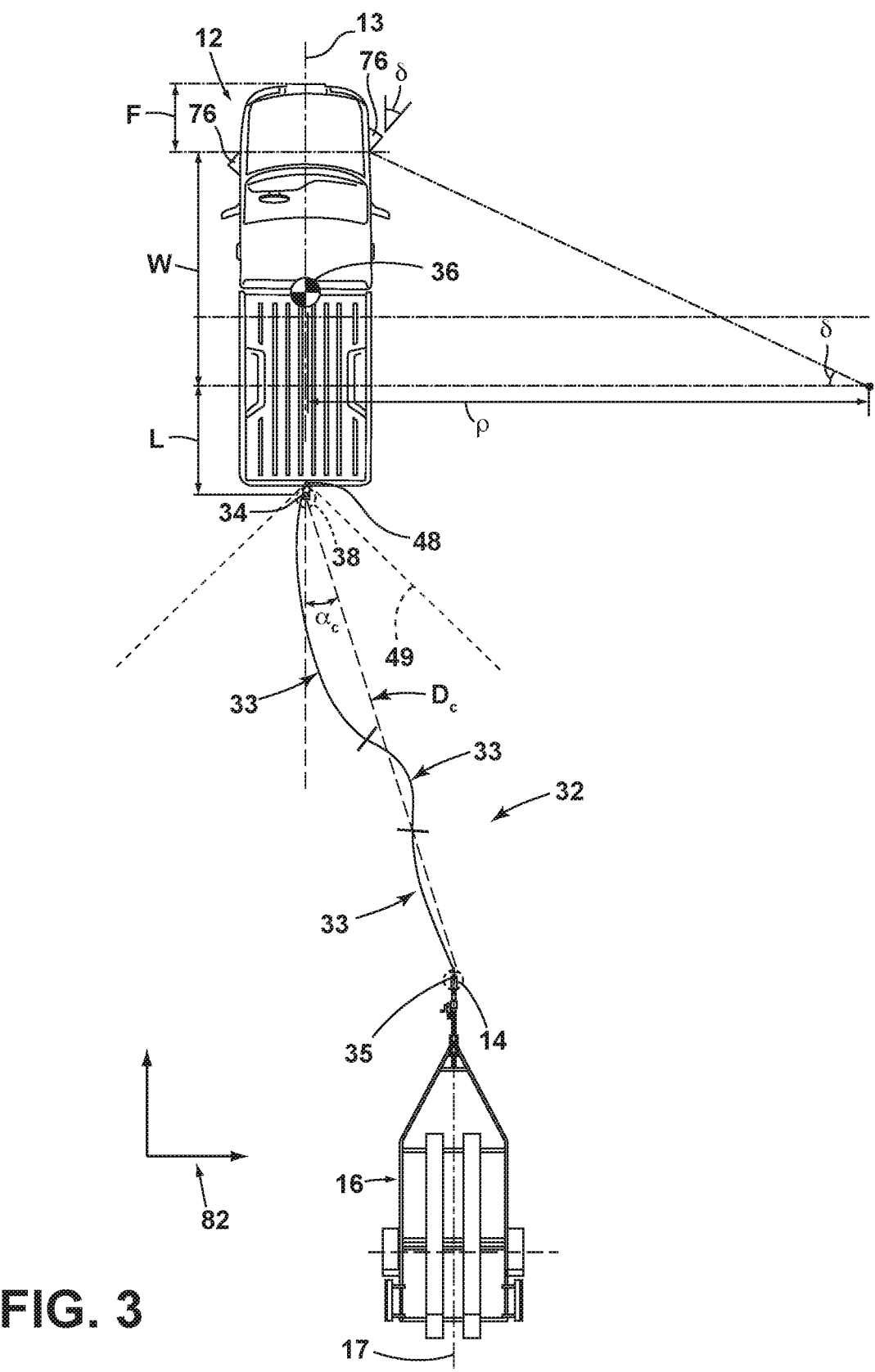
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for unintended contact with trailer 16, and can bring vehicle 12 to a complete stop at a determined endpoint 35 of path 32. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent contact with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CMHSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein my generally used for purposes of vehicle control, such as under control of the user, including potentially with assistance of an on-board computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of an number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without other, unintended contact between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{W}{\tan\delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{W}{\tan\delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement Δx of coupler 14 in a driving direction by determining the movement of coupler 14 in the vertical direction Δy that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle $\delta$, as dictated by path 32, depending on the position of vehicle 12 therealong. It is additionally noted that in an embodiment, the path 32 may comprise a progression of steering angle $\delta$ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 4:
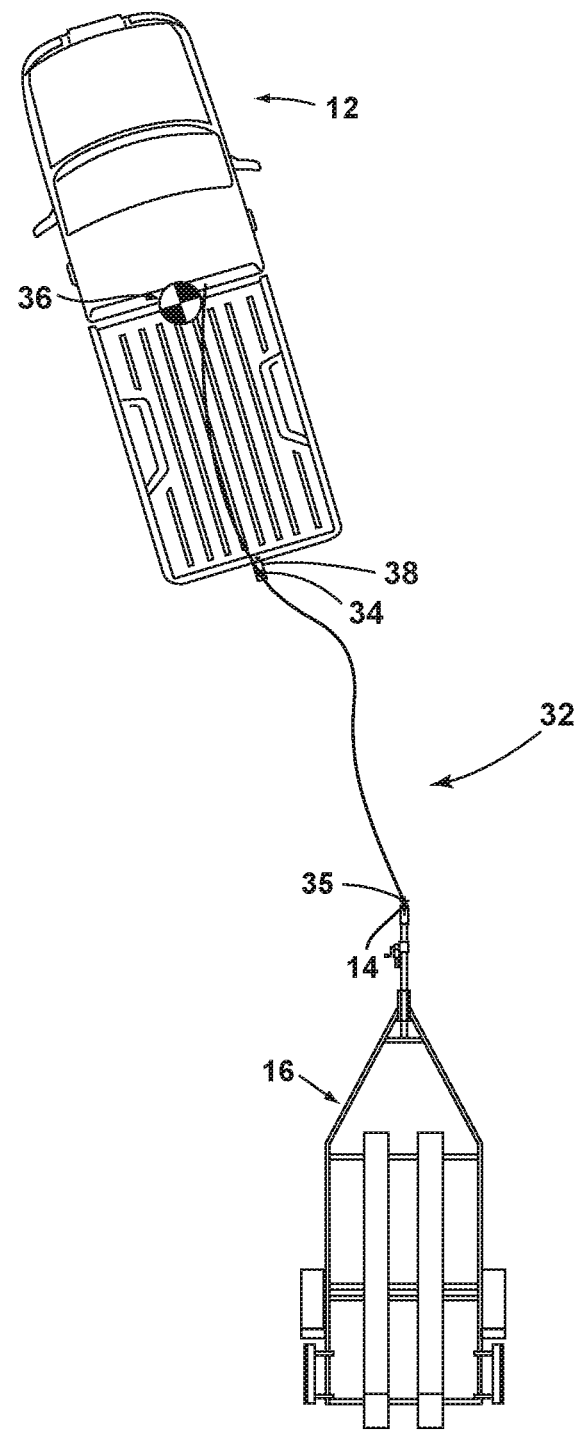
FIG. 4 is an overhead schematic view of the vehicle during a subsequent step of the alignment sequence with the trailer.
Figure 5:
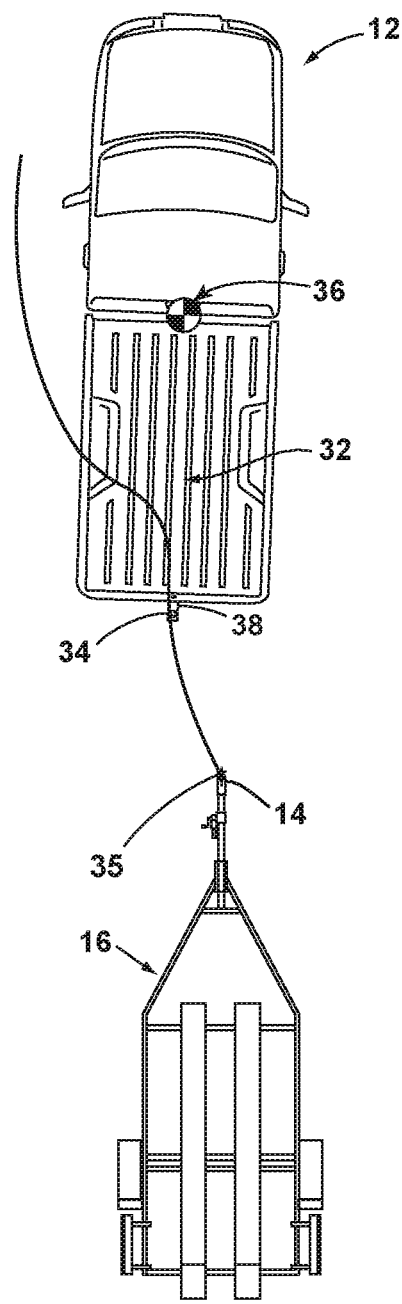
FIG. 5 is an overhead schematic view of the vehicle during a subsequent step of the alignment sequence with the trailer.
Figure 6:
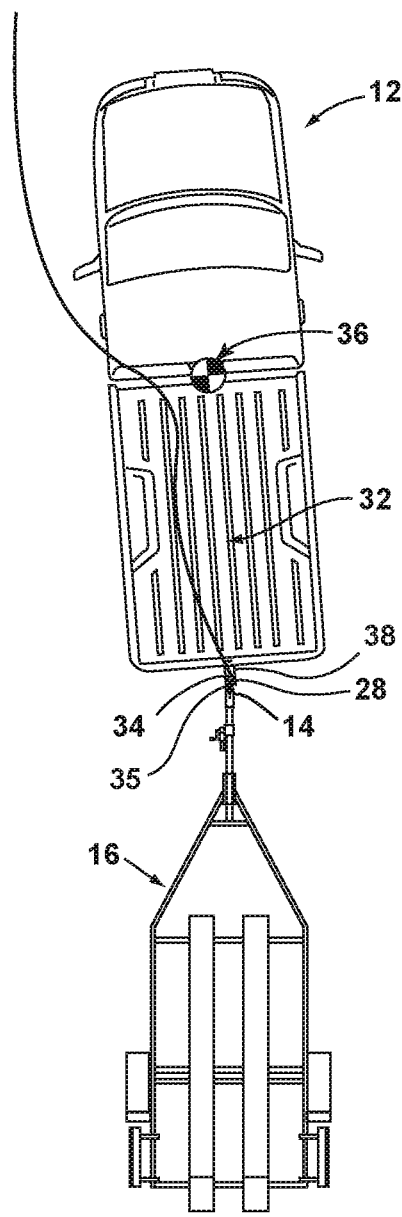
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified, and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14, constantly or once available, during execution of operating routine 68, including as coupler 14 comes into clearer view of rear camera 48, with continued movement of vehicle 12 along path 32. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $α_c$ information due to closer resolution or additional image data 55), including as vehicle moves closer to trailer 16, as shown in FIGS. 4 and 5. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $δ_{max}$, while tracking the position $D_c$, $α_c$ of coupler 14 to converge the known relative position of hitch ball 34 to the desired position 38d thereof relative to the tracked position 28 of coupler 14, as discussed above and shown in FIG. 6.

During an assisted hitching operation, such as in the example described with respect to FIGS. 4-6, system 10 requires a minimum amount of longitudinal distance between the vehicle 12 and the trailer 16 to control movement of vehicle 12 with a level of precision desired to achieve the desired final position of hitch ball 34 with respect to coupler 14 (i.e., without overshooting the desired final location, such that hitch ball 34 moves past the coupler 14, or otherwise ending operating routine 68 with hitch ball 34 positioned relative to coupler 14 such that manual movement of trailer 16 is required). The required minimum distance can vary but is generally influenced by the requirements of image processing routine 64, as well as the requirements of speed sensor 56, the responsiveness of the throttle 73 and vehicle brake control system 72, as well as the general processing speed of controller 26 of other components of system 10. In one example, image processing routine 64 may require a minimum travel distance for calibration thereof, including to accurately identify coupler 14 and to assist in tracking of vehicle 12 movement. As discussed further below, the particular minimum distance can be estimated for a given implementation of system 10, based on known values or estimates for such factors. In general, because of the minimum travel distance requirement, if vehicle 12 is at a standstill with insufficient longitudinal distance remaining between hitch ball 34 and coupler 14, the system 10 is programmed to either not initiate operating routine 68 or, if already started, abort operating routine 68 to avoid overshooting the final target position such that hitch ball 34 moves past endpoint 35. In various examples, vehicle 12 may be brought to a standstill for reasons other than operating routine 68 causing the application of the vehicle brakes 70. In particular, vehicle 12 may come to a standstill before reaching the desired final target position due to uneven terrain acting on the vehicle wheels 76 or 77, or by the vehicle brakes 70 being manually applied by the driver. Because such events can cause a vehicle 12 standstill at any point along path 32, the present system 10 provides the ability to detect such a standstill event and to address it appropriately given the capabilities and requirements of system 10. In various examples, system 10 can address an early standstill by aborting, pausing, or automatically rectifying the standstill condition.

As mentioned above, the "longitudinal control" in an assisted hitching maneuver is the portion of vehicle 12 movement along path 32 controlled by the vehicle powertrain control system 72 and the vehicle brake system 70 with the "longitudinal control" being the portion controlled by the power assist steering system 20. It is to be understood that the lateral control requires movement of the vehicle such that the two control schemes operate together to move vehicle 12 along the path 32. In this respect, the longitudinal alignment of the path 32 with the coupler 14 is dictated by the longitudinal control (i.e., by the steering system 20) and the final stopping point of vehicle 12 along path 32 is dictated by the longitudinal control. In this respect, the final stopping point of the vehicle 12 along path 32 determines the alignment in the direction of travel between hitch ball 34 and coupler 14. In this manner, system 10 may be able to move vehicle 12 to the final target position in a precise manner, for example, such that trailer 16 does not have to be manually repositioned by the user, but can simply be lowered onto hitch ball 34. In one implementation of system 10, the accuracy in final longitudinal alignment of hitch ball 34 with coupler 14 can be to within 1 cm of a completely aligned position (center-to-center). Again, the particular implementation of system 10 can be such that controller 26 requires a minimum amount of longitudinal travel distance to perform a sequence of events for the desired hitch ball 34 and coupler 14 alignment. Such a sequence can include increasing the engine speed (using throttle 73 via powertrain control system 72) and reducing the brake pressure (via brake control system 70) until vehicle 12 begins moving. Controller 26 can receive feedback data during vehicle 12 movement regarding measured vehicle speed and localization (by way of speed sensor 56 and positioning system 22, respectively) such that controller 26 can apply brake pressure and reduce engine speed to bring the vehicle 12 to a standstill at the final target position with hitch ball 32 at endpoint 35. Again, to begin movement to a detectable speed or by a detectable distance and return the vehicle 12 to a stop (including in a comfortable manner), the above sequence requires a minimum amount of travel distance to perform. In one example, based on the vehicle 12 and terrain conditions, the system 10 may be capable of accurately moving the vehicle 12 by a minimum of 0.2 m, with any lesser distance not being accurately controllable. Accordingly, if the vehicle 12 is, for whatever reason, at a standstill with less than 0.2 m between the hitch ball 34 and the subject coupler 14, system 10 will be unable to travel to the target position without an undesirable chance of overshooting or falling short of the final target position such that hitch ball 34 is short of endpoint 35. As discussed above, the particular requirements of any implementation of system 10 may vary in various respects that affect the minimum travel distance, which may be characterized as a threshold distance $D_{min}$, below which system 10 may not be able to initiate movement under operating routine 68. According to such variations, the threshold distance $D_{min}$ may be between 15 cm and 20 cm, for example. Again, such misalignment can increase the chance of vehicle 12 contacting the trailer 16 at coupler 14 or can otherwise result in misalignment of the hitch ball 34 and the coupler 14 by an amount outside of user expectations for system 10 use.

There are a number of events that can cause vehicle 12 to reach a standstill during an assisted hitching maneuver before reaching the final target position. As discussed above, controller 26 executing operating routine 68 does not directly cause vehicle 12 to stop until it is determined that vehicle has reached the final target position with hitch ball 34 aligned with endpoint 35; however, various operating conditions may cause vehicle 12 to inadvertently reach a standstill during operation. Notably, during execution of operating routine 68, a low speed of vehicle 12 is maintained (at least within the final 1 to 2 m of the final target position, as determined by the distance between hitch ball 34 and endpoint 35) to allow for precise stopping in the desired position at the end of the operation. At such low speeds, the vehicle 12 carries a lower inertia and is driven by a lower torque output of the engine such that vehicle 12 may be brought to a standstill by uneven terrain, or by driver-applied braking (even at a generally light application pressure). In one example, the vehicle 12 speed during at least the latter stages of operating routine 68 execution may be on the order of 0.1 kph. In an example, an assisted hitching maneuver may occur off of a paved surface, including on uneven terrain that can easily bring the vehicle to a stop (i.e. bumps, pits, rocks). In other examples, the vehicle 12 may encounter debris or other articles or defects (rocks, cracks, potholes, bumps) in a paved driving surface that may disrupt vehicle 12 movement. Still further, drivers may habitually contact or grasp the steering wheel or depress the brake pedal during vehicle movement, especially when vehicle is close to the trailer 16 where they may not be able to visualize the hitch ball 34 or coupler 14.

Figure 7:
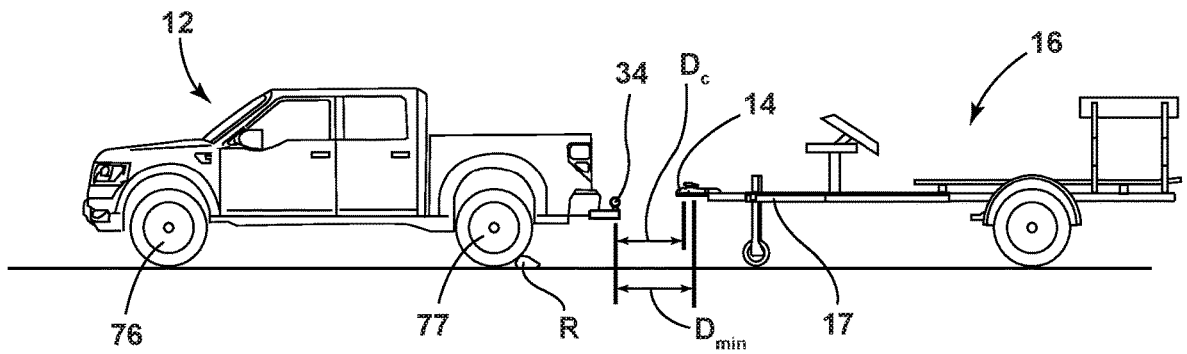
FIG. 7 is a schematic side view of a vehicle in an unintended stopped state while backing toward a trailer.
Figure 8:
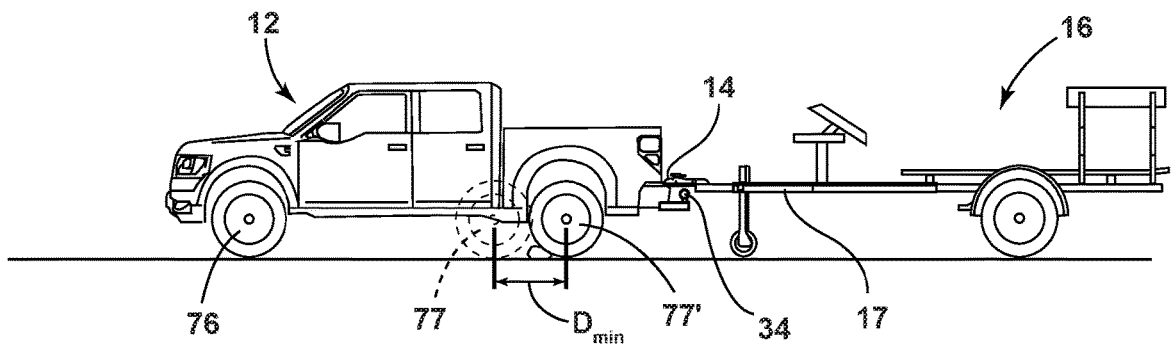
FIG. 8 is a schematic side view of the vehicle after overcoming the unintended standstill state while backing toward the trailer during an assisted hitching maneuver.
Figure 9:
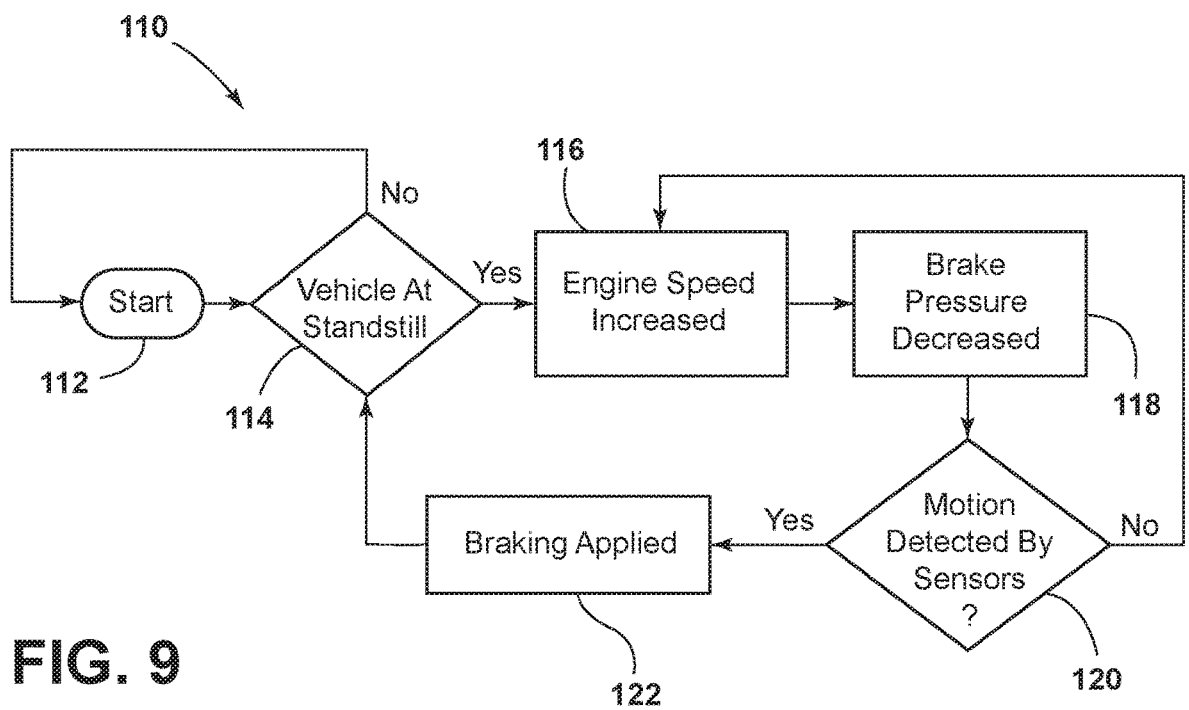
FIG. 9 is s a flowchart depicting steps in an example of a sequence for overcoming an unintended standstill state.

One example of an inadvertent standstill scenario is shown in FIGS. 7 and 8, where the presence of a rock R causes the vehicle to come to a standstill. As illustrated when an article such as rock R of a sufficient size is present in the path of vehicle 12 it can oppose the rearward motion of vehicle 12 by an amount sufficient to cause vehicle 12 to come to a stop. As discussed above, system 10 generally requires a specific minimum distance to accurately move vehicle 12. In this respect, system 10 may be capable of slowly (or otherwise reliably controlling) increasing the application of throttle 73 to overcome rock R, or another comparable obstacle or terrain feature, to initiate movement of vehicle 12, as shown in FIG. 8. Such functionality may be referred to as "nudging" the vehicle 12, and system 10 may be capable of nudging a discrete non-zero amount such that a similar minimum distance is required. The required nudging distance may be due to the nature of operating routine 68 with respect to longitudinal vehicle 12 control in relation to the real-world variables or factors that system 10 is configured to work within. In particular, the sequence of performing a small discrete nudge is shown in FIG. 9. The nudging distance ND may be influenced by a number of factors, including the ground surface gradient, ground terrain quality (i.e. presence of rocks, bumps, and the like), engine system performance (current engine speed, maximum rate of change for engine speed, wind-up protection, and the like), brake system performance (temperature of brake fluid and brake pads), wear condition of brake components, moisture level of braking components, surface friction (e.g., due to tire wear, surface roughness, tire tread type, and the like), brake fluid pressure, actuation delays, wheel diameter (which may change due to tire wear or tire base size), vehicle weight and weight distribution on each wheel, or network and processing delays of the system, among other factors.

Figure 10:
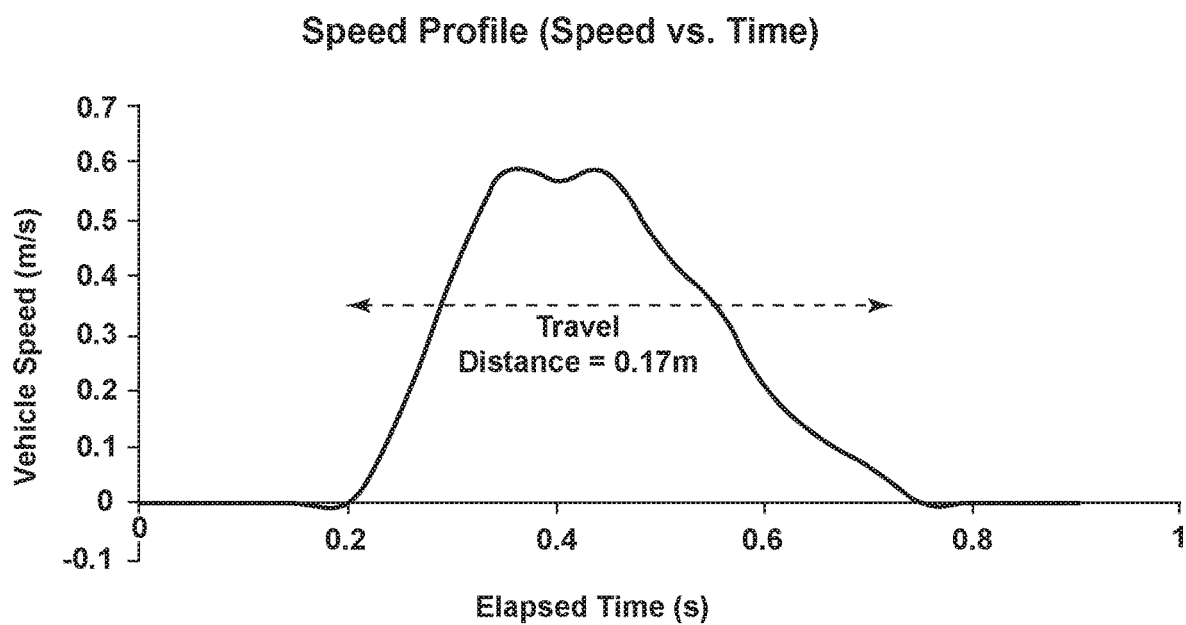
FIG. 10 is an example plot of vehicle data in over a time interval of the sequence of FIG. 9.

Because it may not be feasible to estimate and adjust for all the listed or additional variations in the above (especially because many of the parameters may be unknown to the system 10 or may change over time), the system 10 can, instead, estimate a conservative number for the minimum nudging distance. In one example, such an estimate may be achieved by assuming a situation with poor performance where a generally large minimum travel distance is considered and investigated for a nudging operation. As an example, a conservative minimum nudging distance ND may be determined by assuming a heavy vehicle on a downhill ground gradient, with uneven terrain (e.g. rocks present), with a hot brake system and worn brakes. The minimum travel distance from standstill under such assumptions can be measured. In such an example, the distance ND can be determined as the integral of the data resulting from a computation of the time required to cause vehicle 12 to move, including to overcome an object, and to, subsequently, stop the vehicle 12. An example of such a computation is shown in FIG. 10, by which the minimum nudging distance can be determined as 0.17 m, with other distances being possible based on the particular assumptions and system 10 characteristics. In a similar manner to that which is discussed above, the minimum nudging distance ND can be considered as a minimum distance required between hitch ball 34 and coupler 14 required for system to execute a nudging maneuver. If during an inadvertent standstill, the remaining distance between hitch ball 34 and coupler 14 is insufficient to properly complete the maneuver, system 10 can take appropriate action. In one example, system 10 can strategically abort the assisted hitching maneuver by ending operating routine, as further discussed below when the early standstill condition is "non-recoverable." In the illustrated example, overcoming the rock R causes the vehicle to overshoot the target position because the distance between the hitch ball 34 and coupler 14 is less than the minimum nudging distance ND when the rock R causes the vehicle to stop.

Figure 11:
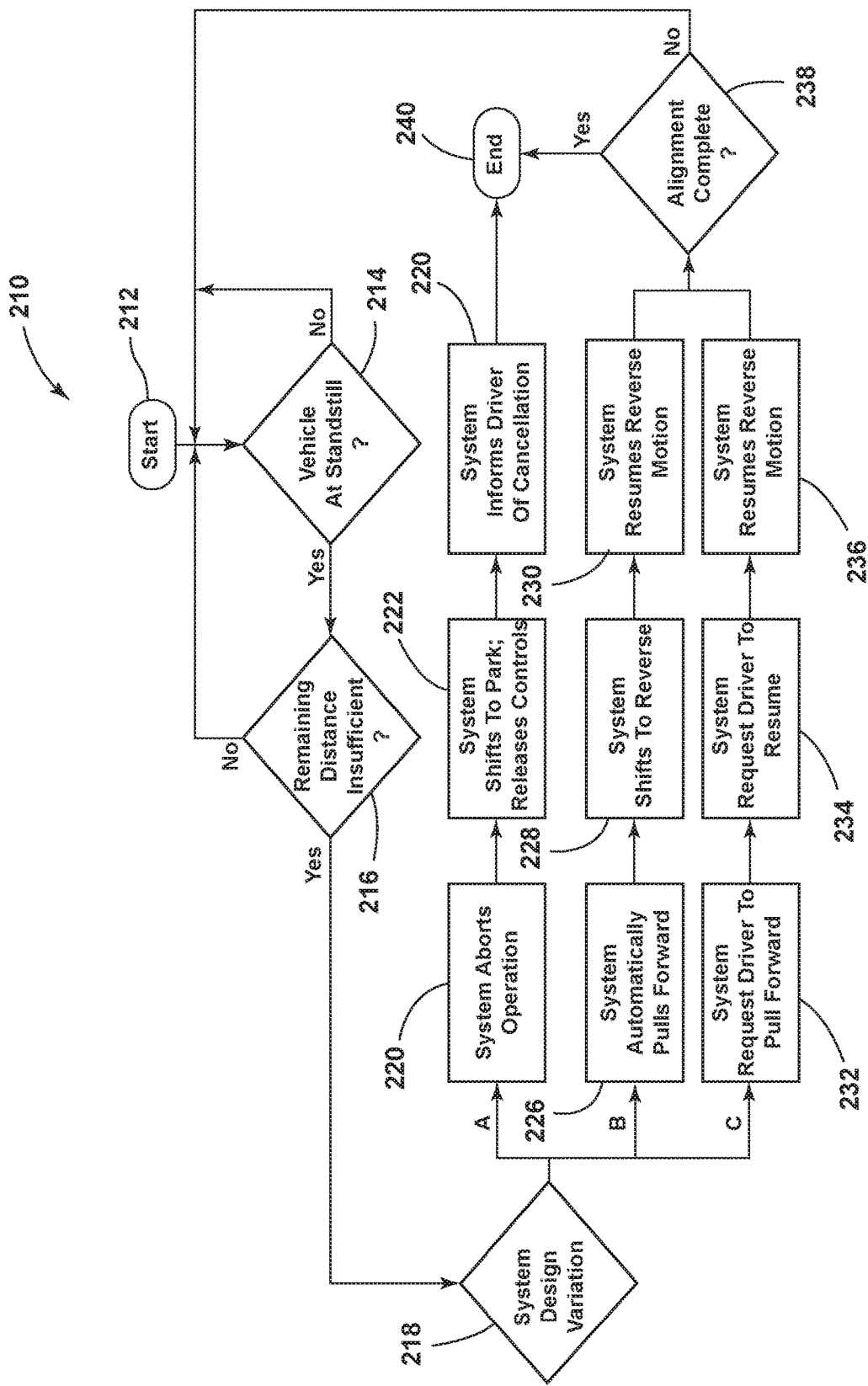
FIG. 11 is a flowchart showing a sequence of steps for addressing an unintended vehicle standstill condition during an assisted hitching maneuver.

To establish a minimum travel distance, the above calculation based on the above-described factors can be made or a similar calculation can be made based on a subset of the above-criteria or additional criteria considered relevant for a particular system or the performance expectations thereof. Still further, a general estimated safe distance can be conservatively established or derived based on real-world system testing. Once the particular minimum travel distance $D_{min}$ is determined, it is set as a constant reference parameter, such as being stored in memory 62. As shown in FIG. 11, a method 210 for using the minimum travel distance $D_{min}$ in connection with a standstill scenario begins when an assisted hitching maneuver has been initiated (step 212). Controller 26 then references this value $D_{min}$ whenever the vehicle is at standstill (step 214), as measured by vehicle speed sensor 56 and/or positioning system 22, prior to completion of operating routine 68 (step 238). If the remaining distance to the final position (i.e. the distance $D_c$ between hitch ball 34 and coupler 14) is less than this reference value $D_{min}$ (step 216), the system 10 does not attempt to re-initiate vehicle 12 motion. Instead, system 10 keeps vehicle 12 at standstill, and performs a remedial action that is based on the capabilities of the particular implementation of system 10 and/or the desired user experience associated with system 10 (step 218). In one example, system aborts the maneuver (step 220) and secures the vehicle in Park (step 222), including by operation of electronic gear selector 92 through communication with powertrain control system 72. System 10 then informs the driver of the standstill condition and the insufficient distance to complete the maneuver (step 224), such as by a message presented on vehicle HMI 40, and ends the maneuver (step 240). In connection with the notification in step 224, system 10 can request that the driver move the vehicle 12 in a forward direction to increase the distance $D_c$ between coupler 14 and hitch ball 34 before restarting the maneuver (step 212).

In another implementation, system 10 is capable of shifting the transmission via gear selector 92 into drive from reverse and is, further, capable of forward driving (including by incorporation of one or more forward-facing cameras within camera system 18 and forward facing sensors within proximity sensor array 54. In connection with such a system 10, when a standstill is detected (step 214) with insufficient distance $D_c$ to restart rearward movement (step 216), system 10 can shift the vehicle into drive and automatically pull the vehicle forward by a predetermined distance (e.g., about 0.5 m), or until $D_c$ is detected as being above the minimum distance $D_{min}$, so that the remaining travel distance $D_c$ is sufficient to resume reverse movement. After moving the vehicle 12 forward, system stops the vehicle 12 and shifts to reverse (step 228), and then resumes reverse motion (step 230). System 10 then tries again to reach the final target position 35 with the sequence continuing until alignment is complete (step 238). In a still further implementation, various implementations of system 10 may not allow for automatic forward motion, due to unavailability of front sensors, for example. In such instances, system 10, upon detecting a standstill is (step 214) with insufficient distance $D_c$ to restart rearward movement (step 216), pauses the maneuver (instead of aborting) and asks the driver to pull forward (step 232), such as by way of a message presented on vehicle HMI 40. Assuming that the driver follows the system 10 request and shifts the gear selector 94 into drive and moves vehicle 12 forward by a sufficient distance, system 10 can indicate to the driver that the maneuver can be resumed and ask the driver to shift into reverse and confirm that the driver is ready for the maneuver to resume (step 234), which can similarly be done via vehicle HMI 40. When such a confirmation is received, system 10, resumes the maneuver (step 236) by controlling reversing movement of vehicle until the final target position is reached (step 238).

As an additional aspect of system 10 functionality, implementations are contemplated in which system 10 can determine the cause of an unintended standstill and can provide a corresponding indication to the driver by an appropriate message presented on vehicle HMI 40. In this respect, system 10 can be configured to distinguish between at least some of: a terrain-induced standstill (e.g., an object or uneven terrain quality obstructing vehicle 12 movement); high inclination; a driver-induced standstill (i.e., by brake 70 application); a system 10 error; or inadvertent contact with the trailer 16 (i.e. by the rear bumper of vehicle 12). By distinguishing the cause of the standstill condition, system 10 is able to inform the driver to directly or indirectly communicate how the driver can prevent the condition in future maneuvers or remedy the standstill condition in the current maneuver. In a further aspect, system 10 may consider if the vehicle is "close enough" aligned an aligned position between the hitch ball 34 and the coupler 14 to declare completion of the maneuver instead of an abort (even though, technically, an abort has occurred). As discussed above an inadvertent standstill near the end of an assisted hitching maneuver can occur for a number of reasons, including those related to the low speeds at which the maneuver is carried out or intervention by the driver.

Figure 12:
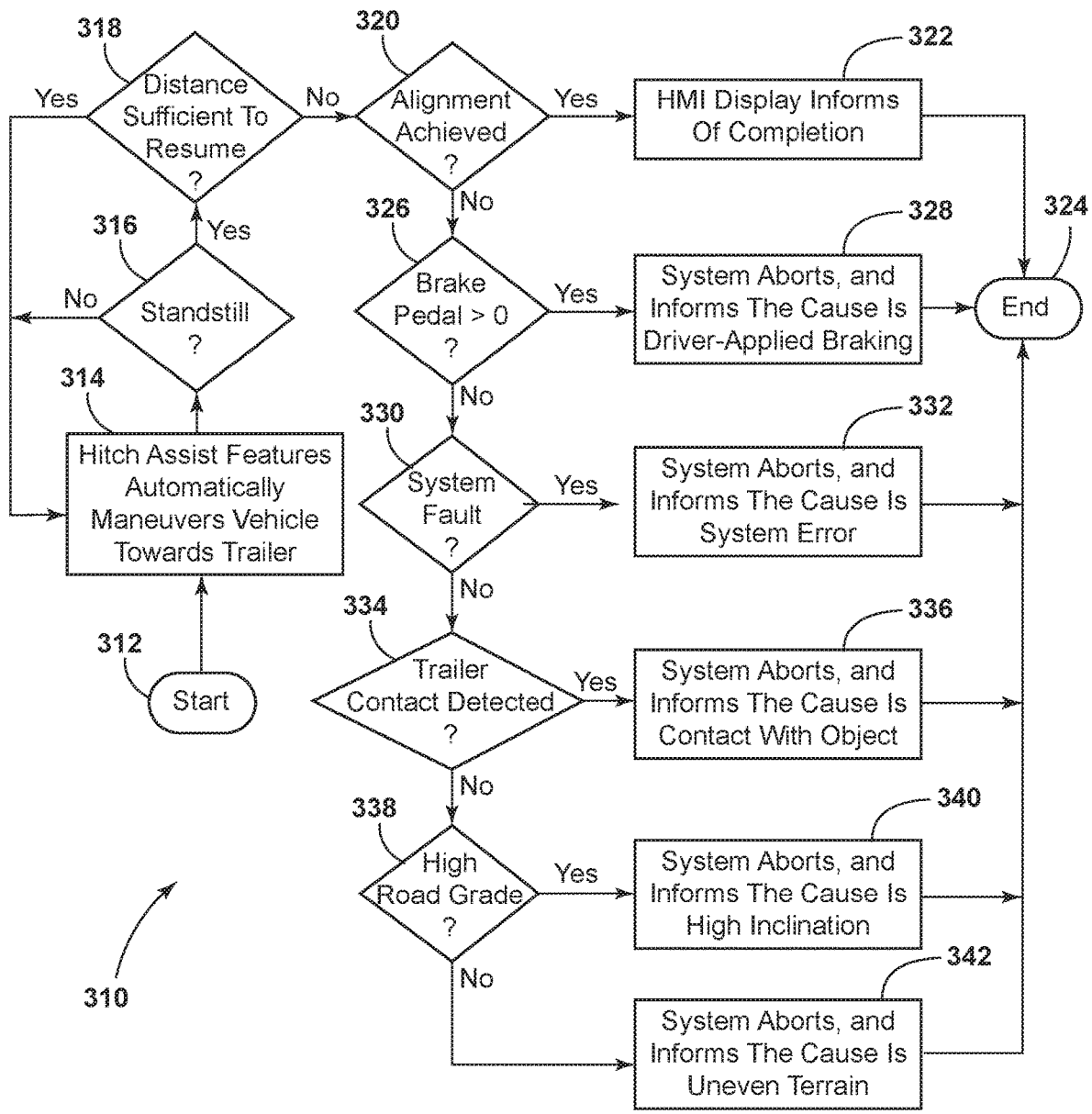
FIG. 12 is a flowchart showing a sequence of steps for determining a cause of an unintended vehicle standstill condition during an assisted hitching maneuver.

The present aspects of system 10 are discussed in the context of an implementation of system 10, as described above, wherein system 10 aborts an assisted hitching maneuver due to standstill condition occurring with insufficient remaining travel distance $D_c$ (steps 214-220, as discussed above with respect to FIG. 11). In this respect, in addition to communicating the abort (step 224) to the driver, system 10 is capable of distinguishing the reason for the standstill among a number of potential standstill causes, as shown in the flowchart of FIG. 12. In the method 310 shown in FIG. 12, system 10 begins at initiation of an assisted hitching maneuver (step 312), in a similar manner to method 210, discussed above. During backing of the vehicle 12 under control of system 10 (step 314) during the assisted hitching maneuver, controller 26 monitors the signal from the vehicle speed sensor 56 and the positioning system 22, among other reasons, to determine if vehicle 12 reaches an unintended standstill (step 316). Without such as standstill condition, system 10 continues backing vehicle 12 (step 314) until the final target position is reached. If an unintended standstill is detected (step 316), system 10 determines (step 318) is sufficient distance to overcome the standstill or otherwise resume backing is possible. In this respect, if the distance $D_c$ between hitch ball 34 and coupler 14 is sufficient to resume backing, system 10 does so (step 314). If there is insufficient distance $D_c$ to resume the maneuver, system 10, in addition to proceeding according to steps 214-220 in FIG. 11, as discussed above, can execute a series of parameter checks to assess the standstill condition and determine the appropriate indication for the user.

Figure 13:
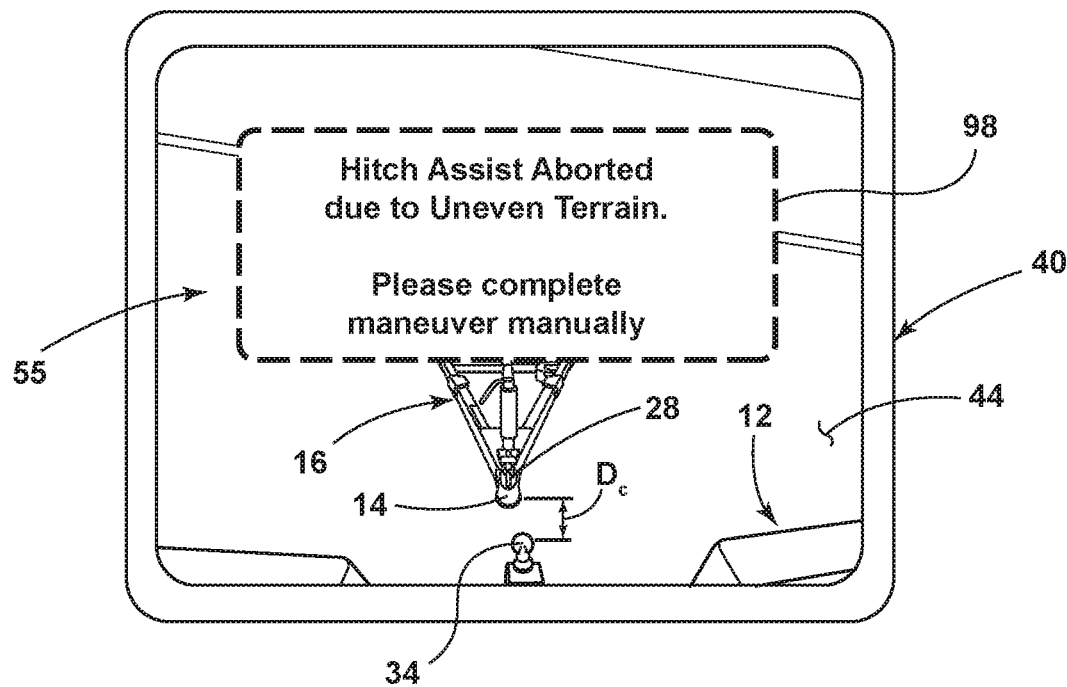
FIG. 13 is an example message presentable to a user indicating an unintended standstill at an acceptable alignment location.
Figure 14:
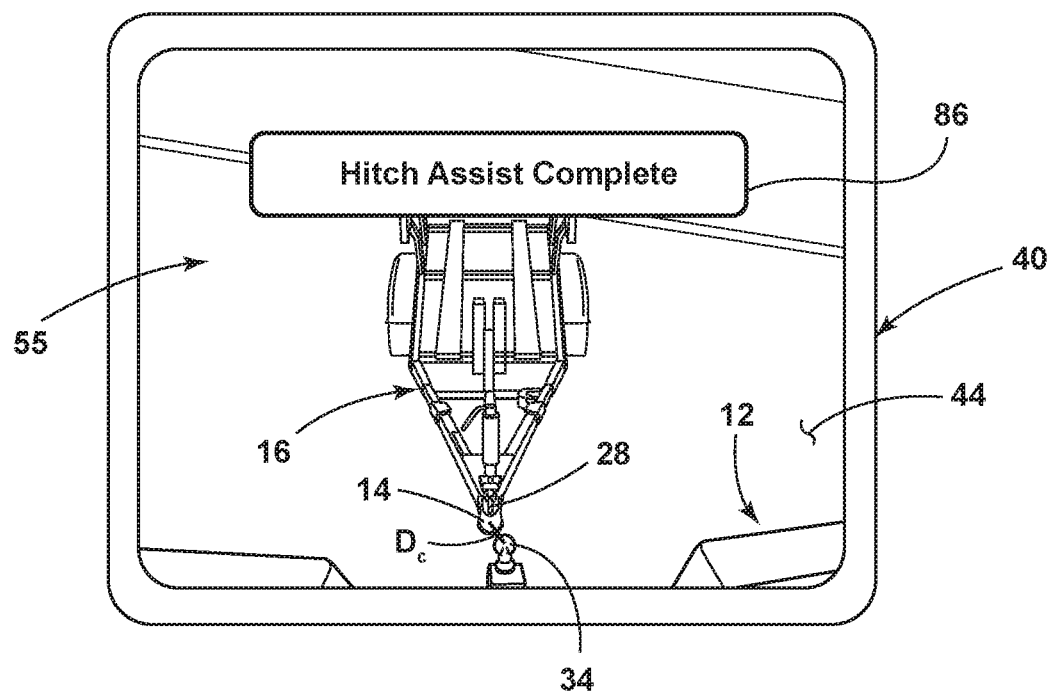
FIG. 14 is an example message presentable to a user indicating an unintended standstill outside an acceptable alignment location and at a distance below a threshold.

In particular, system 10 can first determine if the distance $D_c$ between hitch ball 34 and coupler 14 (or other alignment indication) indicates sufficient positioning of hitch ball 34 relative to coupler (step 320) to indicate to the user that the process is complete (step 322), thereby ending the maneuver (step 324) as a completed maneuver, rather than an abort. The particular alignment sought for such an indication can vary, but can be determined such that coupler 14 will generally fall into place over hitch ball 34 when lowered into the desired horizontal position or if only minor manual alignment is needed (i.e., by the user manipulating trailer 16 tongue 84 under force. In this respect, it is recognized that a user may prefer such slight misalignment, even to the extent that some forcible movement of trailer 16 is required, to pulling forward and restarting another assisted hitching operation, particularly when the same condition may cause such subsequent maneuver to be similarly unsuccessful. In one implementation, the system 10 can determine that a standstill corresponds with an acceptable final position (step 320) when the distance $D_c$ between hitch ball 34 and coupler 14 is less than 4 cm or the like, for example, or, in another example, when hitch ball 34 is obscured by coupler 14 within the image data 55. When an acceptable final standstill position is determined, system 10 can indicate (step 322) a complete procedure to the user, such as by a message 86 presented on HMI 40 display 44, as shown in FIG. 13. In one example, a terrain-induced standstill may occur just before the actual completion of the alignment, but the final position may still be within a threshold distance of alignment. In this respect, it is noted that the lower the minimum travel distance threshold $D_{min}$ in step 318, and the higher the acceptable threshold in step 320, the more likely this situation is to occur. Accordingly, regardless of the cause of the standstill, if the distance $D_c$ between hitch ball 34 and coupler 14 is sufficient for the standstill position to be considered "aligned", then the system 10 declares a successful completion of the maneuver to the driver via the HMI 40.

If it is determined that the distance $D_c$ between hitch ball 34 and coupler 14 does not meet the criteria for an acceptable final position (step 320), system 10 can then check a brake application signal from a brake pedal sensor 71 within the brake control system 70 (step 326) if the application signal indicates a nonzero brake position, system 10 can infer that the standstill was caused by driver intervention (step 328) and can indicate to the driver, via another HMI 40 message (step 328) that driver-applied braking caused the abort, while ending the process (step 324). This helps the user understand the function of the system 10 in regards to allowing braking near the very end of the maneuver. The user is able to then retry the maneuver with this new knowledge. If the driver did not cause the standstill, system 10 then checks if a system fault is present (step 330) by communication with the system fault monitor 88, which monitors the status of the various sensors and monitoring devices within system 10, as well as their communication status with controller 26 and the state of controller 26 and its communication with the operable vehicle systems and controls. If any of the sensors is not functioning or is out of communication with controller 26, if the function of controller is diminished, or if the controller's communication with or the function of the brake system 70 or the powertrain control system 72, system 10 function may be affected such that an inadvertent standstill results. While it may be unlikely for a system fault to occur after the maneuver begins and proceeds to a point at least close to completion, the condition is checked to ensure the system 10 is fully functional, before the system 10 continues with further evaluation. If a system fault exists in step 330, system 10 provides a corresponding HMI message to inform the driver that a system error is present (step 332). In this respect, system 10 may recommend that the user seek diagnostic servicing.

If it is determined in step 330 that the system 10 is functioning properly, the system 10 proceeds to check for contact with an object (which may include trailer 16 or another environmental object) obstructing vehicle 12 movement (step 334). To detect such contact, system 10 can review time-based sensor data (including speed sensor 56) for an interval preceding the standstill condition, with a change in speed from the already low speed to zero over a short interval indicating contact with an object. Still further vehicle can be fitted with a contact sensor (such as within the rear bumper or the like) to determine such contact. If contact with an object is detected, system 10 indicates the likely contact to the driver by another message on HMI 40. If no contact is detected in step 334, system 10 can communicate with vehicle incline sensor 90 to determine if a high road grade caused the standstill condition (step 334) with an appropriate HMI message being given by system 10 as the process is aborted (step 336). Due to the low traveling speed of vehicle 12 during the latter stages of the assisted hitching maneuver, a surface grade of about 20% may cause a standstill such that an appropriate threshold can be set for such consideration. Finally, if no high road grade is detected in step 334, system 10 can infer, essentially by default, that the standstill was caused by uneven terrain and can notify the driver by message 98 presented on HMI 40 while aborting the maneuver. It is noted that similar notifications can be given to the user as a reason for automated vehicle 12 repositioning due to a standstill, as discussed with respect to steps 223-230 in FIG. 11, or in connection with a system 10 pause and request that the driver reposition vehicle 12 by forward driving, as discussed above with respect to steps 232-236 in FIG. 11.

In a further aspect, system 10 may be able to address specific terrain-related issues beyond simply identifying that a standstill is caused by terrain in general and aborting or pausing a maneuver for repositioning. In one implementation, system 10 is able to specifically identify a standstill caused by wheel slip (i.e. due to a loss of traction, including possibly in connection with an obstruction, such as a muddy rut or the like) resulting in a stuck vehicle condition. Additionally or alternatively, system 10 may be able to identify the occurrence of an understeer event that can affect the ability of system 10 to navigate vehicle 12 toward the final target position with hitch ball 34 at endpoint 35 with an acceptable level of accuracy. In either such instance, system 10 may be able to pause and handover the controls to the driver so that the driver can remedy the situation my manual control. It is noted that this functionality is similar to that which is described above with respect to steps 232-236 in FIG. 11, but with understeer not necessarily corresponding with a standstill condition and with wheel slip being a specific, separately identifiable standstill condition. In this respect, if a wheel slip or understeer event takes place for a specified time, for example, system 10 can notify the driver to reposition the vehicle and can communicate the underlying cause (i.e., wheel slip or understeer) so that the driver can independently assess the situation and determine the appropriate remedy (e.g., carefully negotiating vehicle 12 out of a rut or moving to a flatter or less slippery terrain). In the present implementation, system 10 does not need to abort an assisted hitching maneuver due to the identified terrain challenges. Instead, the driver is given the option to overcome the challenge through manual maneuvering, and is then allowed to resume the assisted hitching maneuver once the challenge is overcome. System 10 can reengage automated maneuvering without needing to restart the routine 68 because system 10 remains active and tracks the trailer 16 and/or coupler 14 during manual repositioning by the driver.

Figure 15:
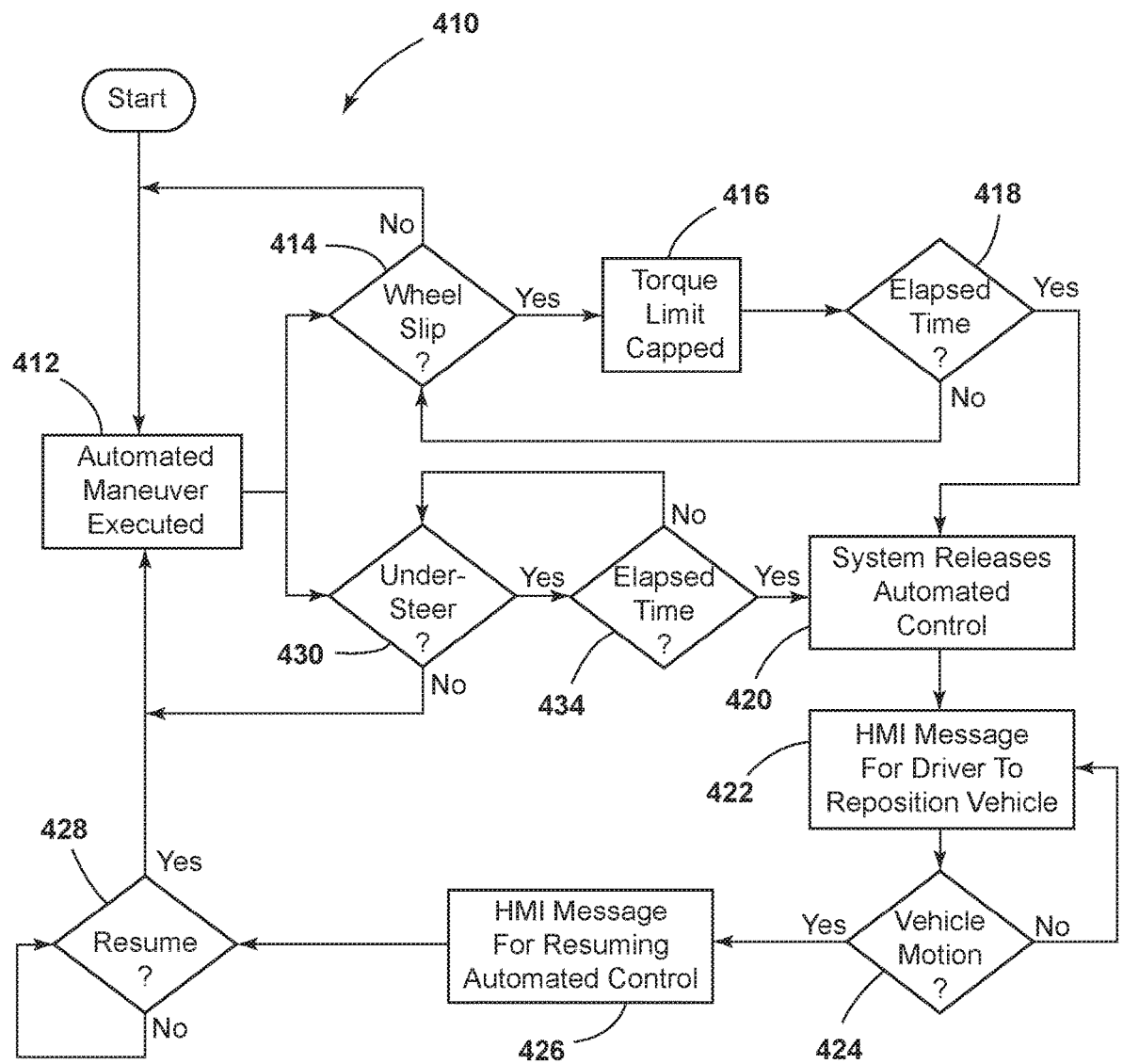
FIG. 15 is a flowchart showing a sequence of steps for determining and addressing an adverse vehicle traction condition during an assisted hitching maneuver.
Figure 16:
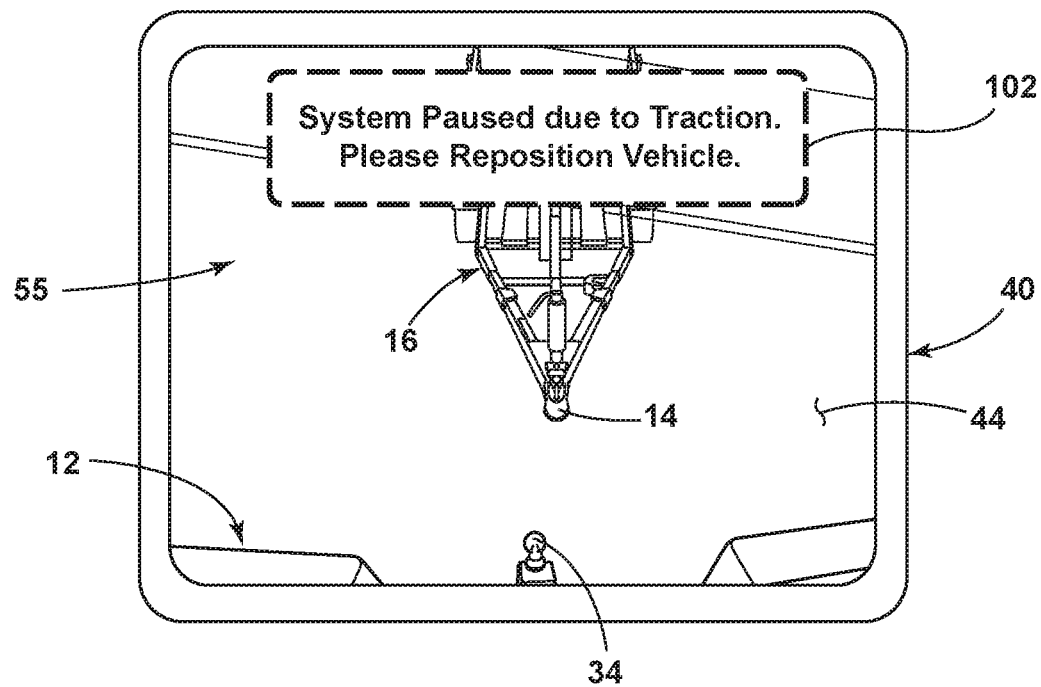
FIG. 16 is an example message presentable to a user indicating a standstill at an acceptable alignment location.

As shown in FIG. 15, a method 410 is depicted for dealing with the above-described terrain conditions while system 10 is executing an assisted hitching maneuver, as discussed above (step 412). In this respect, while vehicle 12 is under system 10 control to back vehicle 12 to the desired final target location (i.e., endpoint) 35, controller 26 continuously monitors for a wheel slip condition (step 414) by communication with vehicle speed sensor 56 and wheel rotation sensors 100 operably connected with each of the vehicle wheels 76,77, while the assisted hitching maneuver is being carried out. In this respect, if the speed sensor 56 indicates that vehicle 12 is not moving and at least one of the wheel rotation sensors 100 indicates a rotating wheel, then a wheel slip condition is detected. If no wheel slip is detected in step 414, then system 10 maintains control of the vehicle in executing the assisted hitching maneuver. If a wheel slip is detected in step 414, then controller 26 initially continues attempting to move the vehicle 12 by continued application of torque via powertrain control system 72. In this respect it is not desired that controller 26 provide maximum power to the wheels 76,77 (particularly the slipping wheel) or increase the power demand too quickly, as doing so may cause the wheel to spin at a high rate. Accordingly, limit is set (step 416) to protect from temporary, yet abrupt vehicle movement if traction is regained. The limit may be in the form of a rate limiter, such that torque is ramped up slowly, as well as a cap (e.g., to about 50% of total torque, depending on the total available torque). Because such application may not ultimately result in vehicle 12 becoming unstuck, a timer is set in place that determines how much time has elapsed while a wheel is slipping. If the wheel slip condition persists for longer than a set time (e.g. 1 second) (step 418), the controller may cease applying engine torque and may temporarily release control of vehicle 12 to the user (step 420) while providing an appropriate message 98 via HMI 40 (step 422), as shown in FIG. 16. In particular, the message 98 can request that the driver reposition the vehicle 12 to regain traction. The "handover" process may also involve securing the vehicle by shifting the gear selector 94 to park or applying the parking brake by way of brake system 70. Controller 26 can continue to cause HMI 40 to show the reposition message 102 until controller detects (e.g, by speed sensor 56) that vehicle 12 begins to be move.

Figure 17:
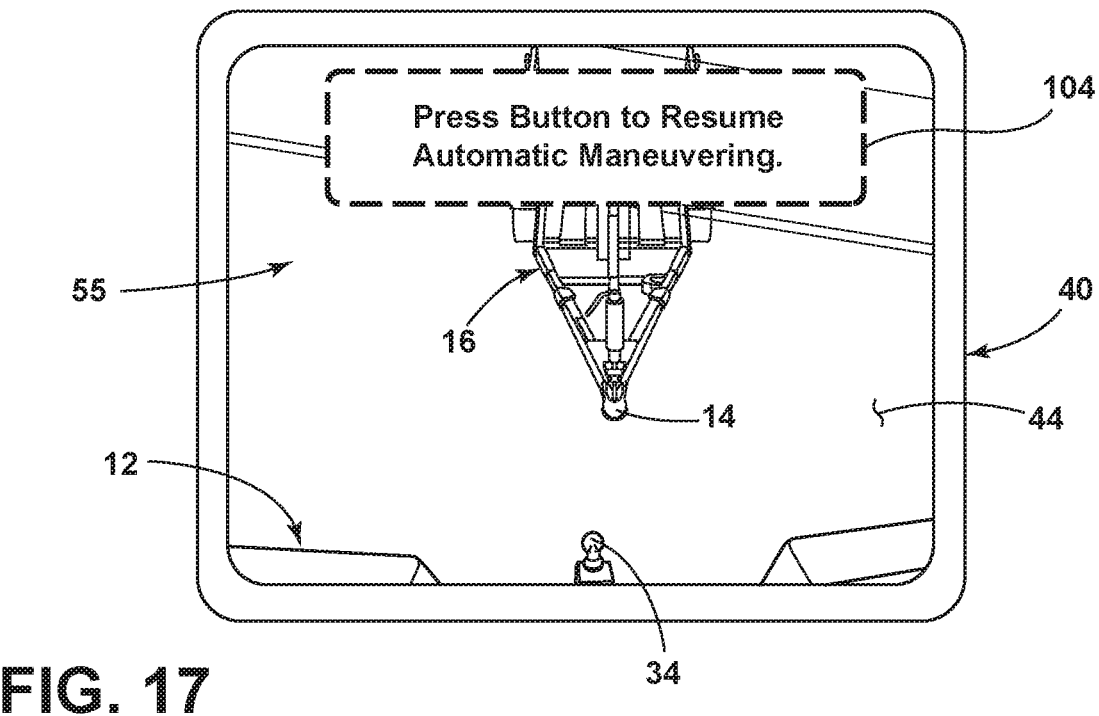
FIG. 17 is an example message presentable to a user indicating that an assisted hitching maneuver can be resumed.

Once vehicle 12 movement is detected (step 424) controller 26 can present the driver with an option to resume the assisted hitching maneuver (step 426) when traction is regained, via a subsequent message 104 on HMI 40, as shown in FIG. 17. This sequence allows the driver to resume the maneuver at their own judgment and when ready. When the driver resumes the assisted hitching maneuver, such as by re-pressing a keep-alive button 106, controller 26 regains control of the vehicle 12 and continues attempting to back vehicle 12 to the desired final target position wherein hitch ball 34 is at endpoint 35. During driver repositioning, controller 26 continues to track the position 28 of the targeted coupler 14 and/or trailer 16, so that the assisted hitching maneuver can be resumed after the driver repositions the vehicle 12.

In a similar manner, while controller 26 executes the assisted hitching maneuver, it can continuously monitor for understeer (step 430). In this manner controller 26 can monitor the position of vehicle, either using positioning system 22 to assess whether vehicle 12 is maintained along path 32, or by tracking the position 28 of coupler 14, for example, against an expected position thereof based on the steering angle δ and vehicle 12 speed. If understeer is detected (e.g., based on vehicle 12 not following desired path 32 while moving) in step 430, then it can be inferred that the system 10 cannot physically achieve the desired steering angle δ. Such a condition may be indicative of terrain interference (either an object adjacent to the front wheel, or soft or slippery terrain, particularly on an angled surface). In a similar manner to the wheel slip condition, a timer is set in place that determines how much time a detected understeer event has taken place. If understeer persists for longer than a set time (e.g., 1 s) (step 434), the controller may cease applying engine torque and may temporarily release control of vehicle 12 to the user (step 420) while providing an appropriate message 98 via HMI 40 (step 422), as shown in FIG. 16. In particular, the message 98 can request that the driver reposition the vehicle 12 to regain traction, in a similar manner to that which is discussed above. Again, controller 26 can continue to cause HMI 40 to show the reposition message 102 until controller detects (e.g, by speed sensor 56) that vehicle 12 begins to be move. Once vehicle 12 movement is detected (step 424) controller 26 can present the driver with an option to resume the assisted hitching maneuver (step 426) when traction is regained, via a subsequent message 104 on HMI 40, as shown in FIG. 17. When the driver resumes the assisted hitching maneuver, such as by re-pressing a keep-alive button 106, controller 26 regains control of the vehicle 12 and continues attempting to back vehicle 12 to the desired final target position where hitch ball 34 is at endpoint 35. During driver repositioning, controller 26 continues to track the position 28 of the targeted coupler 14 and/or trailer 16, so that the assisted hitching maneuver can be resumed after the driver repositions the vehicle 12.

It is noted that, as discussed above, the various methods 210, 310, 410 can be combined or otherwise adapted to be used together in various implementations of system 10 or can be used alone in further implementations of system 10, as described herein.

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer, comprising:
   an imaging system outputting image data;
   a vehicle control system including at least one vehicle sensor outputting a signal including information related to a vehicle movement state and a vehicle brake system; and
   a controller:
      controlling the vehicle using the vehicle control system to move the vehicle into an aligned position, where a hitch ball mounted on the vehicle is aligned with a coupler of the trailer, including monitoring the signal from the vehicle sensor and tracking a position of the coupler relative to the hitch ball in the image data; and
      when the information related to the vehicle movement state indicates an unintended stopped vehicle state, determining a distance from the hitch ball to the coupler, if the distance is above a predetermined threshold, controlling the vehicle control system to cause the vehicle to move, and, if the distance is below the predetermined threshold, indicating the unintended stopped vehicle state to a driver of the vehicle, the predetermined threshold being set at a distance from the hitch ball to the coupler that is sufficient for the controller to control the vehicle brake system and the vehicle powertrain control system to cause the vehicle to overcome the stopped vehicle condition.

2. The system of claim 1, wherein the predetermined threshold is between 15 and 20 centimeters.

3. The system of claim 1, wherein, if the distance is below the predetermined threshold, the controller stops controlling the vehicle using the vehicle control system without the vehicle moving into the aligned position.

4. The system of claim 3, wherein:
the vehicle control system further includes a vehicle brake system having a parking brake, wherein:
prior to the controller stopping controlling the vehicle, the controller uses the vehicle control system to engage the parking brake.

5. The system of claim 3, wherein, when indicating the unintended stopped vehicle condition, the controller requests that the driver of the vehicle use the vehicle control system to move the vehicle in a forward direction.

6. The system of claim 4, wherein, when the distance from the hitch ball to the coupler increases to above the predetermined threshold, the controller:
notifies the driver; and
resumes controlling the vehicle using the vehicle control system to move the vehicle into the aligned position.

7. The system of claim 1, wherein when the information related to the vehicle movement state indicates the unintended stopped vehicle state, the controller further:
uses information from the at least one vehicle sensor to determine a cause of the unintended stopped vehicle state; and
includes a communication of the cause when indicating the unintended stopped vehicle state to the driver of the vehicle.

8. The system of claim 7, wherein:
the at least one vehicle sensor is at least one of a brake pedal sensor, a system fault monitor, a vehicle speed sensor, a vehicle incline sensor, and a wheel rotation sensor; and
the controller uses information from the at least one vehicle sensor to determine the cause of the unintended stopped vehicle condition among one of: a driver-applied braking event, a system fault, a high road grade condition, an object contact condition, a stuck vehicle condition, or a uneven terrain condition.

9. The system of claim 1, wherein:
the vehicle control system includes:
a vehicle brake system;
a vehicle powertrain control system; and
a vehicle steering system; and
controlling the vehicle using the vehicle control system includes using the vehicle brake system, the vehicle powertrain control system, and the vehicle steering system.

10. The system of claim 9, wherein the unintended stopped vehicle state is indicated when the vehicle is stopped without the controller having controlled the vehicle brake system to stop the vehicle.

11. A vehicle, comprising:
an imaging system outputting image data;
a vehicle-human machine interface having a display screen;
a control system including at least one vehicle sensor outputting a signal including information related to a vehicle movement state; and
a hitch assistance system:
controlling the vehicle using the vehicle control system to move the vehicle into an aligned position, where a hitch ball mounted on the vehicle is aligned with a coupler of a trailer, including monitoring the signal from the vehicle sensor and tracking a position of the coupler relative to the hitch ball in the image data; and
when the information related to the vehicle movement state indicates an unintended stopped vehicle state, determining a distance from the hitch ball to the coupler, if the distance is above a predetermined threshold, controlling the vehicle brake system and the vehicle powertrain control system to cause the vehicle to move, and, if the distance is below a predetermined threshold, indicating the unintended stopped vehicle state to a driver of the vehicle by causing a message to be displayed on the display screen.

12. The vehicle of claim 11, wherein the predetermined threshold is set at a distance from the hitch ball to the coupler that is sufficient for the hitch assistance system to use the vehicle control system to cause the vehicle to overcome the stopped vehicle condition without moving past the aligned position.

13. The vehicle of claim 12, wherein, when indicating the unintended stopped vehicle condition, the hitch assistance system requests that the driver of the vehicle use the vehicle control system to move the vehicle in a forward direction.

14. The vehicle of claim 13, wherein, when the distance from the hitch ball to the coupler increases to above the predetermined threshold, the hitch assistance system:
notifies the driver; and
resumes controlling the vehicle using the vehicle control system to move the vehicle into the aligned position.

15. The vehicle of claim 11, wherein when the information related to the vehicle movement state indicates the unintended stopped vehicle state, the hitch assistance system further:
uses information from the at least one vehicle sensor to determine a cause of the unintended stopped vehicle state; and
includes a communication of the cause when indicating the unintended stopped vehicle state to the driver of the vehicle.

16. The vehicle of claim 15, wherein:
the at least one vehicle sensor is at least one of a brake pedal sensor, a system fault monitor, a vehicle speed sensor, and a vehicle incline sensor; and
the hitch assistance system uses the information from the at least one vehicle sensor to determine the cause of the unintended stopped vehicle condition among one of: a driver-applied braking event, a system fault, a high road-grade condition, an object contact condition, or a uneven terrain condition.

17. The vehicle of claim 11, wherein:
the at least one vehicle sensor includes a wheel rotation sensor;
when the information related to the vehicle movement state indicates the unintended stopped vehicle state, the hitch assistance system further uses information from the wheel rotation sensor to determine that the unintended stopped vehicle state corresponds with a stuck vehicle condition such that controlling the vehicle brake system and the vehicle powertrain control system to cause the vehicle to move is unsuccessful;
requesting that the driver use the vehicle control system to reposition the vehicle to overcome the stuck vehicle condition; and
resuming controlling the vehicle using the vehicle control system to move the vehicle into the aligned position upon confirmation from the user that the stuck vehicle condition has been overcome.

18. A method for moving a vehicle to align a hitch ball mounted on the vehicle with a coupler of a trailer, comprising:

controlling a vehicle control system, including using a vehicle brake system, a vehicle powertrain control system, and a vehicle steering system within the vehicle control system, to move the vehicle toward the trailer;

tracking a position of the coupler relative to the hitch ball in image data received from a vehicle imaging system;

monitoring a signal from a vehicle sensor including information related to a vehicle movement state; and when the information related to the vehicle movement state indicates an unintended stopped vehicle state, determining a distance from the hitch ball to the coupler, if the distance is above a predetermined threshold, controlling the vehicle brake system and the vehicle powertrain control system to cause the vehicle to move, and, if the distance is below a predetermined threshold, indicating the unintended stopped vehicle state to a driver of the vehicle.

19. The method of claim 18, wherein the unintended stopped vehicle state is indicated when the vehicle is stopped without the use of the vehicle brake system to stop the vehicle.

20. The method of claim 18, wherein the predetermined threshold is set at a distance from the hitch ball to the coupler that is sufficient for control of the vehicle brake system and the vehicle powertrain control system to cause the vehicle to overcome the stopped vehicle condition.

* * * * *